United States Patent [19]

Hanlon

[11] Patent Number: 4,801,773
[45] Date of Patent: Jan. 31, 1989

[54] SHROUD TO COVER DISH IN MICROWAVE OVEN

[76] Inventor: Ronnie Hanlon, 5307 East 33 St., Tulsa, Okla. 74135

[21] Appl. No.: 103,674

[22] Filed: Oct. 1, 1987

[51] Int. Cl.$^4$ .............................................. H05B 6/80
[52] U.S. Cl. ...................... 219/10.55 E; 99/DIG. 14; 229/DIG. 14; 426/243; 150/52 R
[58] Field of Search ................... 219/10.55 E, 10.55 F, 219/10.55 R; 99/451, DIG. 14; 150/52 R; 220/420, 421, 440, 70; 229/DIG.14

[56] References Cited

U.S. PATENT DOCUMENTS

| | | | |
|---|---|---|---|
| 1,955,745 | 4/1934 | Hurley | 220/440 |
| 2,033,285 | 3/1936 | Harvey | 229/DIG. 14 |
| 2,687,026 | 8/1954 | Gleason | 312/284 |
| 3,215,307 | 11/1965 | Connell | 220/440 |
| 4,169,537 | 10/1979 | Sabreen et al. | 220/70 |
| 4,345,133 | 8/1982 | Cherney et al. | 219/10.55 E |
| 4,350,261 | 9/1982 | Roth | 220/70 X |
| 4,425,368 | 1/1984 | Watkins | 219/10.55 E |
| 4,532,397 | 7/1985 | McClelland | 219/10.55 G |
| 4,563,561 | 1/1986 | Vaeth et al. | 219/10.55 G |
| 4,574,174 | 3/1986 | McGonigle | 219/10.55 E |
| 4,613,738 | 9/1986 | Saville | 219/10.55 E X |

*Primary Examiner*—Philip H. Leung
*Attorney, Agent, or Firm*—Robert E. Massa

[57] ABSTRACT

A protective cover for a dish being heated in a microwave oven is formed of moisture-absorbent, microwave transparent material forming a top member and an encircling wall member depending downwardly from the periphery of the top member to completely cover the dish to protect the interior of the oven from any possible spattering of food particles during the heating. The cover is formed of absorbent material so that any escaping fluids and food particles may be captured or absorbed by the cover. The wall member is fluted to give the cover self-supporting rigidity, and an upper edge of each fluted portion coincides with a scalloped portion of the top member. The cover may be treated with a microwave safe resin to increase the rigidity of the cover.

9 Claims, 2 Drawing Sheets

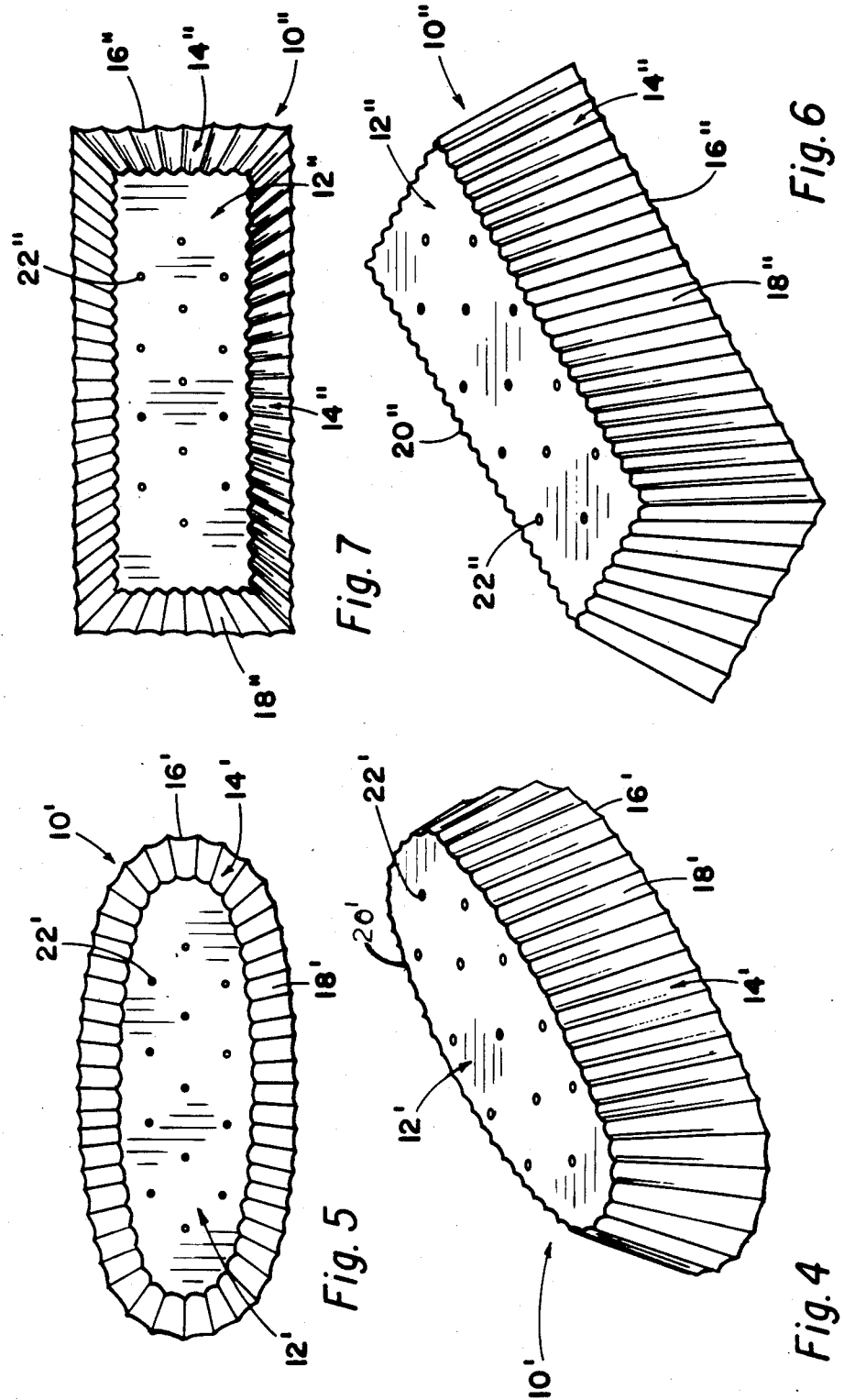

SHROUD TO COVER DISH IN MICROWAVE OVEN

FIELD OF THE INVENTION

My invention relates to dish covers. More particularly, my invention relates to dish covers for food dishes during heating within a microwave oven. Still more particularly, my invention relates to disposable dish covers for use during heating of food within a microwave oven.

BACKGROUND OF THE INVENTION

The development and popularity of microwave ovens has required and encouraged the coincidental development of containers and accessories adaptable for use within the microwave ovens because of the unique qualities of the microwave system.

The microwave oven has greatly changed the food preparation habits of both the family and commercial food establishments. The microwave oven is fast, efficient, and clean. The food preparer may cook food in serving dishes, or even, at times, on the plates from which the food is to be eaten. Especially, food may be warmed on dinner plates. Thus, cooking pots, pans, and trays are frequently eliminated, saving additional preparation and cleaning time and work beyond the time and effort saved by the use of the microwave oven itself.

As is well-known, and emphasized in the prior art, many materials are considered transparent to microwaves, such as paper, glass, ceramics, and various plastics. These microwave transparent materials are in common use as food containers adaptable for heating in microwave ovens, either as original containers for such food items as frozen foods, as utensils for fast and efficient cooking of food, or as containers useful in warming over cooked foods.

Whenever food is heated in a microwave oven, the container should be covered with a microwave transparent material to prevent spattering of food particles throughout the interior of the oven. Spattering normally occurs as water molecules within a restricted portion of food are rapidly converted to steam by the microwave energy. In contrast, when an uncovered cup of water is being heated in the microwave oven, the water will be able to absorb the microwave energy gradually and evenly and become heated to the boiling point without spattering. Thus, where water is tightly enclosed within a small food particle, or essentially encapsulated, as, for example, within a kernel of popcorn, the conversion to steam is sudden and violent, and the energy derived from the sudden expansion will carry food particles away from the container. Other normal organic fluids within the food will react similarly.

We have become increasingly knowledgeable of the capabilities, benefits, uses, and limitations of microwave ovens, we have designed and developed convenient equipment, packaging components and methods, and heating containers to accommodate further specific purposes as our knowledge increases. The prior art discloses many examples of packages and containers which have been developed for use with microwave ovens. In my own search efforts, I have noted the following patents for packages and containers which were designed for microwave ovens or adapt able for such use:

| | | |
|---|---|---|
| 2,687,026 | Gleason | Aug. 24, 1954 |
| 4,345,133 | Cherney et al | Aug. 17, 1982 |
| 4,425,368 | Watkins | Jan. 10, 1984 |
| 4,532,397 | McClelland | July 30, 1985 |
| 4,563,561 | Vaeth et al | Jan. 7, 1986 |
| 4,574,174 | McGonigle | March 4, 1986 |

SUMMARY OF THE INVENTION

The primary object of my invention is to provide a cover for a container for use within a microwave oven.

Another object of my invention is to provide a cover of unique construction which is easy and efficient to use with a container of food being heated in a microwave oven.

Still another object of my invention is to provide a cover for a container of food being heated within a microwave oven which is simple, inexpensive, and easy to use.

Still another object of my invention is to provide a cover for a dish of food being heated in a microwave oven which is of lightweight, absorbent material, and sufficiently inexpensive to be disposable after one use.

Still another object of my invention is to provide a sturdy cover for a food dish during heating in a microwave oven to eliminate extensive soiling of the interior of the oven.

Still another object of my invention is to provide a cover for a dish, containing food, during heating in a microwave oven, which cover remains unaffected by the heating process and does not collapse during this heating.

I have paid particular attention to the manner in which various foods respond to the energy developed in the microwave oven. The inherent properties of different food products deter mine their response to microwave radiation, as, for example, I have mentioned above in reference to popcorn kernels.

Similarly to the reaction of popcorn, when food particles contain substances or molecules which normally respond to microwave energy by expanding, and this expansion tendency is restricted by the properties of the food particles, the energy within the substances or molecules will build up during continuous application of the microwave energy until the accumulated energy over comes the threshold of restriction and a sudden reaction will cause spattering of food particles.

I concluded that spattering of food particles within the microwave oven negated the important advantages of the microwave oven which were: speed of food preparation, cleanliness, and efficiency, by reducing the number of utensils necessary and the time spent in cleaning utensils.

I have designed a dish cover, or shroud, of suitably adaptable size, which is intended to be placed over a food container being heated in a microwave oven, for one-time use, then discarded.

I have seen the necessity for such a cover to be inexpensive, efficient, adaptable to size of food container, absorbent to fluids yet permitting built-up steam to escape from the container. I have also considered it most helpful for the dish cover to be sturdy enough to remain positioned above and out of contact with the food container even should the absorbent cover become saturated with fluids emanating from the heated food.

I have designed my dish cover to incorporate several cooperative features. I have designed my dish cover to have a flat top member to be held a significant distance above the dish by 1 being supported by a wall member which includes a plurality of fluted portions arranged vertically around the wall. The fluted portions coincide with and attach to scalloped portions around the edge of the top member.

The fluted portions of the wall member, which extend from the uppermost edge of the wall to the lower edge of the wall, give much rigidity to the wall to make the cover self-supporting, even after the cover has absorbed a considerable amount of fluids.

Also, the periphery, or circumference, of the lower edge of the wall member is slightly greater than the periphery, or circumference, of the flat top member, so that a plurality of dish covers may easily be stacked for packaging, thus contributing to the convenience of handling of the dish covers and enabling the covers to be produced and sold more economically.

I have provided my dish cover with a plurality of vent holes in the top member to permit the easy and convenient escape of steam and other gaseous components generated during the heating. I have considered the placement of the vent holes in the top member to be more efficient than placing vent holes around the sides of the dish cover, that is, in the wall member.

Further, I have found that for some uses, particularly for some prolonged uses involving moist foods, the strength and rigidity of my dish cover is enhanced by treating the dish cover with a strengthening agent, or forming the dish cover from paper treated with a strengthening or bonding agent, many of which have been well-known in the paper industry, and many of which are constantly being developed and tested. For example, to increase the dry strength of paper, the strengthening agents most commonly used are starch, polyacrylamide resins, and natural gums such as guar gum. Then, also, the paper might require wet strength during use. The paper can gain wet strength by the addition of certain organic resins to the paper stock which then are absorbed by the fibers of the stock. As is well-known in the paper industry, the resins being used then change to an insoluble form, creating water-resistant bonds between fibers.

In summary, I have designed a dish cover or shroud of moisture-absorbent, microwave-transparent material to cover a dish being heated in a microwave oven, with the dish cover or shroud comprising a top member having at least one vent hole to permit the escape of steam and gases produced during the heating of the dish of food, and a wall member depending downwardly from the top member, to surround the dish. The lower edge of the wall member rests on the floor of the microwave oven, surrounding the dish. The wall member includes a plurality of fluted areas extending the width of the wall member from the lower edge therefore to the upper edge. The upper edge of the fluted areas join scalloped portions around the edge of the top, forming an enclosure. The fluted areas give strength to the dish to make the dish self-supporting.

BRIEF DESCRIPTION OF THE DRAWINGS

FIG. 4 is a perspective view of a dish cover describing an alternate embodiment of my invention.

FIG. 5 is a top view of the dish cover shown in FIG. 4.

FIG. 6 is a perspective view of a dish cover describing another alternate embodiment of my invention.

FIG. 7 is a top view of the dish cover shown in FIG. 6.

DESCRIPTION OF THE PREFERRED EMBODIMENTS

Figure 1:
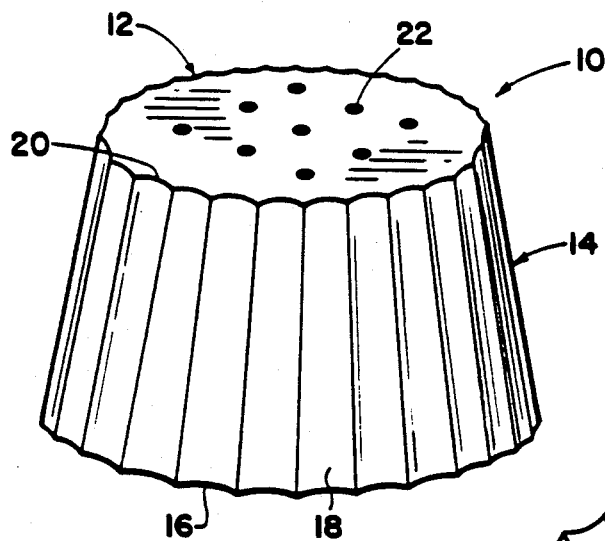
FIG. 1 is a perspective view of a dish cover according to my invention as it would be positioned to cover a dish within a microwave oven.
Figure 3:
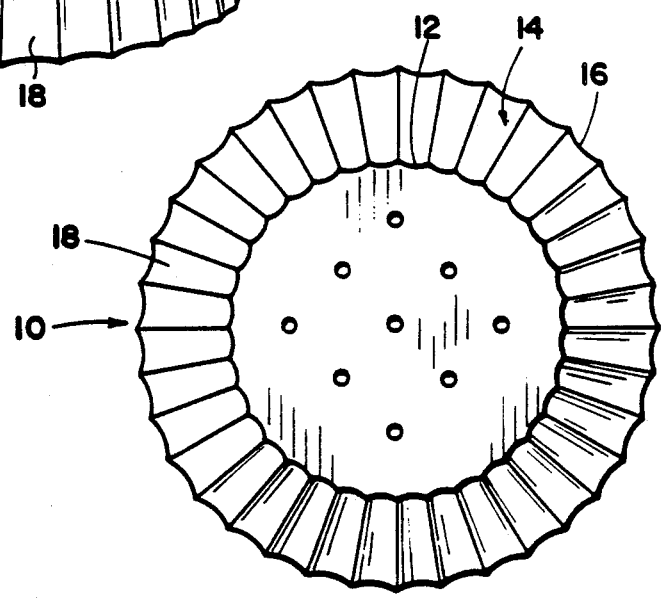
FIG. 3 is a top view of the dish cover shown in FIG. 1.
Figure 2:
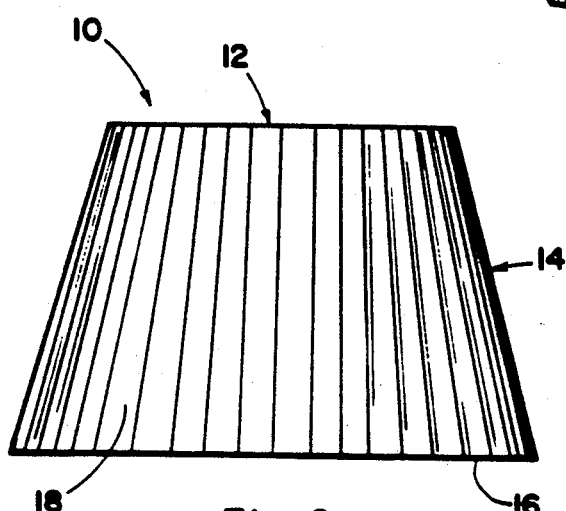
FIG. 2 is a side elevational view of the dish cover shown in FIG. 1.

FIG. 1 is a perspective view of a dish cover 10, generally, which I also refer to as a shroud, shown of frusto-conical configuration, as it would be in position to cover a dish within a microwave oven. In this typical position, a dish being heated within the microwave oven would be completely covered by the dish cover. The dish cover 10 comprises a flat top member 12, generally, and a wall member 14, generally, depending downwardly, in relation to the proper position of use of the cover, from the periphery of the top member 12.

As I stated above, I have designed the wall member 14 so that a lower edge 16 of the wall member 14 will rest on the floor of the microwave oven, forming a protective enclosure with the floor, but not necessarily forming a seal therewith.

The top member 12 and the wall member 14 are formed from paper which is microwave-transparent, moisture-absorbent, and fairly rigid.

However, to assure sufficient rigidity during the period of heating within the microwave oven, I have provided the wall member 14 with a plurality of fluted portions 18 formed in the wall member 14 from the lower edge 16 to the upper extension which adjoins top member 12. Preferably, fluted portions 18 are all of equal size and geometry to ease the manufacturing and packaging of dish cover 10.

I show in the drawings that the circumference or perimeter of the top member 12 should be smaller than the circumference or perimeter of the lower edge 16 of the wall member 14 to make it easier to stack or package the dish covers 10 to save space.

The top member 12 includes scalloped portions 20 which coincide with the upper edge of fluted portions 18.

As I have stressed, I have designed my dish cover 10 to protect the interior of the microwave oven which is being used.

I have chosen moisture-absorbent paper for the dish cover 10, and particularly have designed the dish cover 10 so that the paper thereof would not be coming into contact with the moist food being heated, and also have provided a plurality of vent holes 22 in the top member 12 to permit steam to escape from beneath the dish cover 10. I have particularly positioned these vent holes 22 in the top member rather than around the wall member 14, because, if they were in the wall member 14, there would be a likelihood of considerable moisture and food particles being discharged through the wall member.

In order to accommodate for the differences in geometry of various kinds of dishes and frozen food containers, I have provided alternate embodiments of the structure of my dish cover 10. I have described these modifications in FIGS. 4–7, as a first alternate dish cover 10' as shown in FIGS. 4 and 5, and a second alternate dish cover 10" as shown in FIGS. 6 and 7.

Dish cover 10' shown in FIGS. 4 and 5 has top member 12' of somewhat elliptical geometry to cooperate with dishes having an elliptical or oval shape. This alternate dish cover 10' includes a top member 12', wall member 14' having a lower edge 16' and fluted portions 18', and scalloped potions 20' and vent holes 22' of top member 12', all serving a same purpose as components of a same number shown in FIG. 1.

Dish cover 10" shown in FIGS. 6 and 7 includes a top member 12" of rectangular geometry to cooperate with dishes of similar geometry. Also, dish cover 10" has similar components as the two embodiments enumerated above which serve the same purposes as components of similar identity. Dish cover 10" includes a top member 12" with a wall member 14" having a lower edge 16" and fluted portions 18". Top member 12" has scalloped portions 20" around the perimeter and includes vent holes 22". In FIGS. 6 and 7 I have shown an elongated rectangular dish cover, but I wish for a related structure of dish cover to be suitable, from a square design of the top member to such an elongated rectangular design.

Since many different embodiments of this invention may be made without departing from the spirit and scope thereof, it is to be understood that the specific embodiments described in detail herein are not to be taken in a limiting sense, since the scope of the invention is best defined by the appended claims.

I claim:

1. A shroud to cover a dish in a microwave oven, the shroud formed of moisture-absorbent, microwave-transparent paper, and comprising:

a top member having at least one vent hole to permit the escape of steam during heating of food in the dish, and a plurality of scallops around the edge of the top member, and a wall member depending downwardly from the periphery of the top member, the wall member having a plurality of fluted portions with an upper edge of each fluted portion coinciding with a scallop, and the fluted portions positioned in a manner to strengthen the wall member sufficiently that the wall member is self-supporting.

2. A shroud to cover a dish in a microwave oven as described in claim 1, wherein the top member includes a plurality of vent holes.

3. A shroud to cover a dish in a microwave oven as described in claim 2, wherein the material of the shroud is treated with a microwave-safe resin to cause the shroud to be more rigid.

4. A shroud to cover a dish in a microwave oven as described in claim 3, wherein the top member is substantially flat.

5. A shroud to cover a dish in a microwave oven as described in claim 4, wherein the top member has the scallops around the entire perimeter thereof, and the wall member comprises fluted portions around the entire perimeter thereof.

6. A shroud to cover a dish in a microwave oven as described in claim 5, wherein the plane described by the top member is parallel to the plane described by the lower edge of the wall member.

7. A shroud to cover a dish in a microwave oven as described in claim 6, which is essentially frustro-conical.

8. A shroud to cover a dish in a microwave oven as described in claim 6, which is essentially frustro-pyramidal.

9. A shroud to cover a dish in a microwave oven as described in claim 6, wherein the planar figure described by the top member is essentially elliptical.

* * * * *